(12) United States Patent
Fukushima

(10) Patent No.: US 10,511,729 B1
(45) Date of Patent: Dec. 17, 2019

(54) IMAGE FORMING APPARATUS, IMAGE FORMING SYSTEM, AND COMMUNICATION PROCESSING METHOD IMPLEMENTED GUIDANCE MODE FOR REMOTE MAINTENANCE

(71) Applicant: KYOCERA Document Solutions Inc., Osaka (JP)

(72) Inventor: Keisuke Fukushima, Concord, CA (US)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 15/993,802

(22) Filed: May 31, 2018

(51) Int. Cl.
*H04N 1/00* (2006.01)

(52) U.S. Cl.
CPC ..... *H04N 1/00233* (2013.01); *H04N 1/00167* (2013.01); *H04N 1/00177* (2013.01); *H04N 1/00188* (2013.01); *H04N 1/00411* (2013.01); *H04N 1/00588* (2013.01)

(58) Field of Classification Search
CPC .......... H04N 1/00233; H04N 1/00177; H04N 1/00411; H04N 1/00188; H04N 1/00588; H04N 1/00167
USPC ........................................................ 358/1.15
See application file for complete search history.

(56) References Cited

U.S. PATENT DOCUMENTS

| | | | |
|---|---|---|---|
| 2005/0111013 A1* | 5/2005 | Maekawa | H04N 1/00408 358/1.1 |
| 2016/0070510 A1* | 3/2016 | Iwase | G06F 3/1222 358/1.14 |
| 2016/0286076 A1* | 9/2016 | Kuribara | H04N 1/32771 |

FOREIGN PATENT DOCUMENTS

JP          2007-115039 A        5/2007

* cited by examiner

*Primary Examiner* — Tammy Paige Goddard
(74) *Attorney, Agent, or Firm* — Hawaii Patent Services; Nathaniel K. Fedde; Kenton N. Fedde

(57) ABSTRACT

Provided is the image forming apparatus that is implemented guidance mode. A connecting part connects with a terminal for remote maintenance in a session of a specific protocol. An operation acquiring part acquires operational information corresponding to operation of the terminal connected by the connecting part. A mode changing part is changed into a normal control mode and guidance mode by the operational information acquired by the operation acquiring part. The normal control mode is a mode that actually-controls each part. Also, guidance mode is the mode that controls each part for guidance. An operation control part controls each part by operational information corresponding to the mode changed by the mode changing part.

5 Claims, 6 Drawing Sheets

IMAGE FORMING APPARATUS       NETWORK       SUPPORT TERMINAL

IMAGE FORMING APPARATUS, IMAGE FORMING SYSTEM, AND COMMUNICATION PROCESSING METHOD IMPLEMENTED GUIDANCE MODE FOR REMOTE MAINTENANCE

BACKGROUND

The present disclosure relates to an image forming apparatus, an image forming system, and a communication processing method, especially is associated with the image forming apparatus, the image forming system, and the communication processing method, which enables remote maintenance.

An image forming apparatus, such as an MFP (Multi-Functional Peripheral), is used to print a document and an image.

Here, as typical technology, an equipment management system characterized in that having an electronic apparatus and a remote maintenance server exists. The electronic apparatus displays an operation screen for a user. The remote maintenance server renders a guide image to a transparent panel based on operation of a service person for a service terminal apparatus, which the service person operates. Also, a remote maintenance server makes a transparent panel on an operation screen superimpose and display it in an electronic apparatus. Thereby, the equipment management system can display operation guidance from remote place to the image forming apparatus with low cost, comparatively.

SUMMARY

An image forming apparatus in the present disclosure includes a connecting part configured to connect with a terminal for remote maintenance in a session of a specific protocol; an operation acquiring part configured to acquire operational information corresponding to operation of the terminal connected by the connecting part; a mode changing part configured to change a state of a self-apparatus by the operational information acquired by the operation acquiring part as a normal control mode actually-controlling each part or a guidance mode controlling each part for guidance; and an operation controlling part configured to control each part by the operational information corresponding to the mode changed by the mode changing part.

An image forming system of the present disclosure has an image forming apparatus and a terminal for remote maintenance of the image forming apparatus, wherein; the image forming apparatus includes a connecting part configured to connect with the terminal in a session of a specific protocol; an operation acquiring part configured to acquire operational information corresponding to operation of the terminal connected by the connecting part, a mode changing part configured to change a state of a self-apparatus by the operational information acquired by the operation acquiring part as a normal control mode actually-controlling each part or a guidance mode controlling each part for guidance, and an operation control part configured to control each part by the operational information corresponding to the mode changed by the mode changing part; and the terminal includes a display part configured to display an emulated image emulated on an operation panel part of the image forming apparatus, and an operation transmitting part configured to transmit the operational information having pointer data about movement and depression of a pointer on the emulated image to the image forming apparatus in the session.

A communication processing method of the present disclosure executed by an image forming apparatus capable of communicating with a terminal for remote maintenance, includes the steps of: acquiring an operational information corresponding to operation of the terminal; changing a state of a self-apparatus by the operational information acquired by the operation acquiring part as a normal control mode actually-controlling each part or a guidance mode controlling each part for guidance, and controlling each part by the operational information corresponding to changed mode.

SPECIFICATION

Embodiment

[System Configuration of Image Forming System X]

Figure 1:
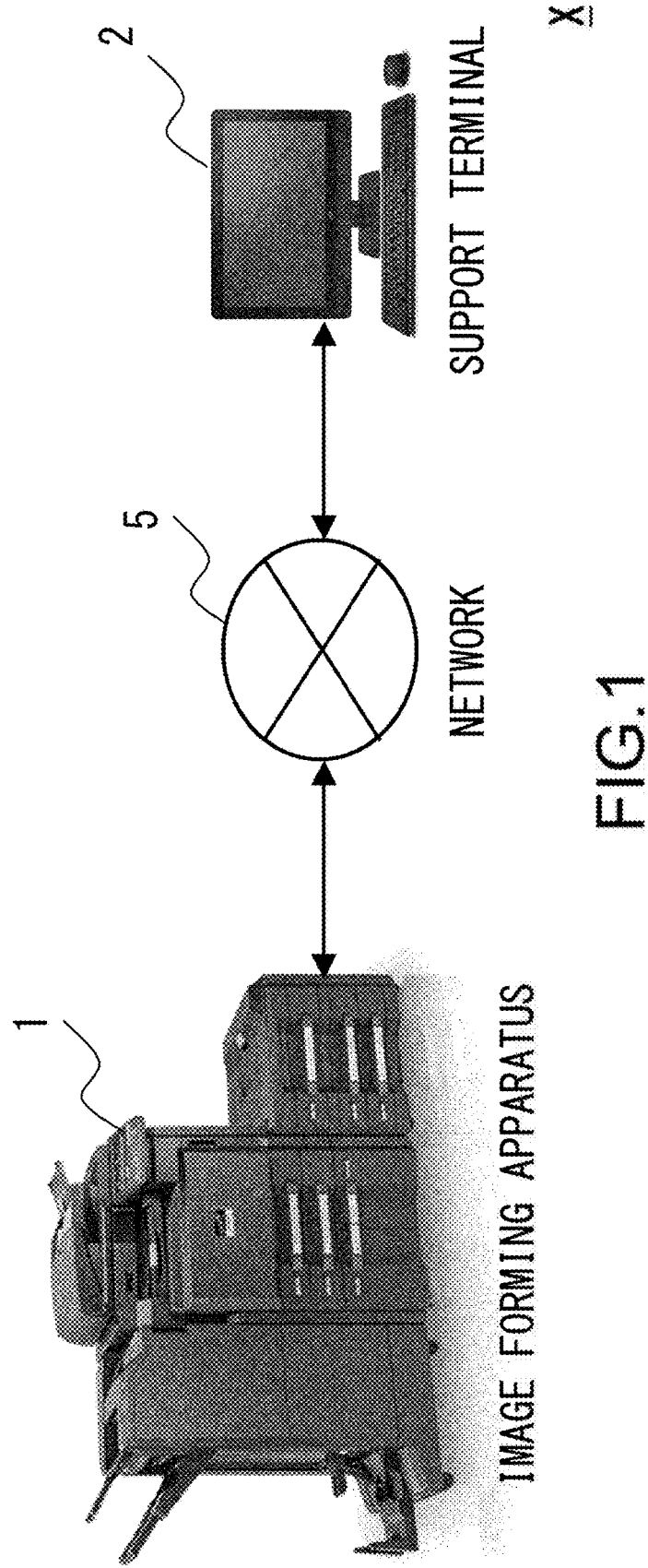
FIG. 1 is a system configuration figure of the image forming system according to an embodiment of the present disclosure.
Figure 2:
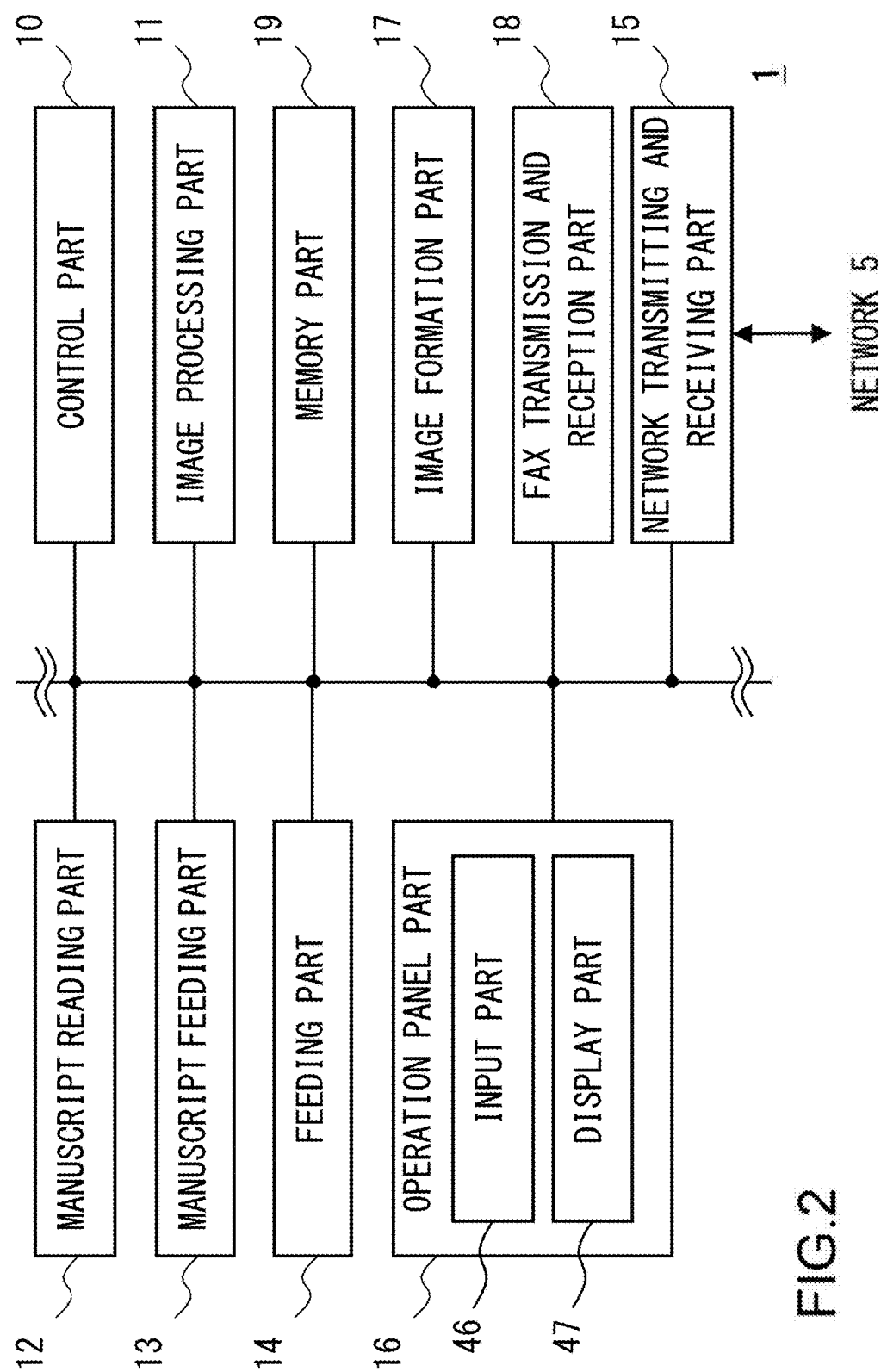
FIG. 2 is a block diagram showing a control configuration of the image forming apparatus as shown in FIG. 1.
Figure 3:
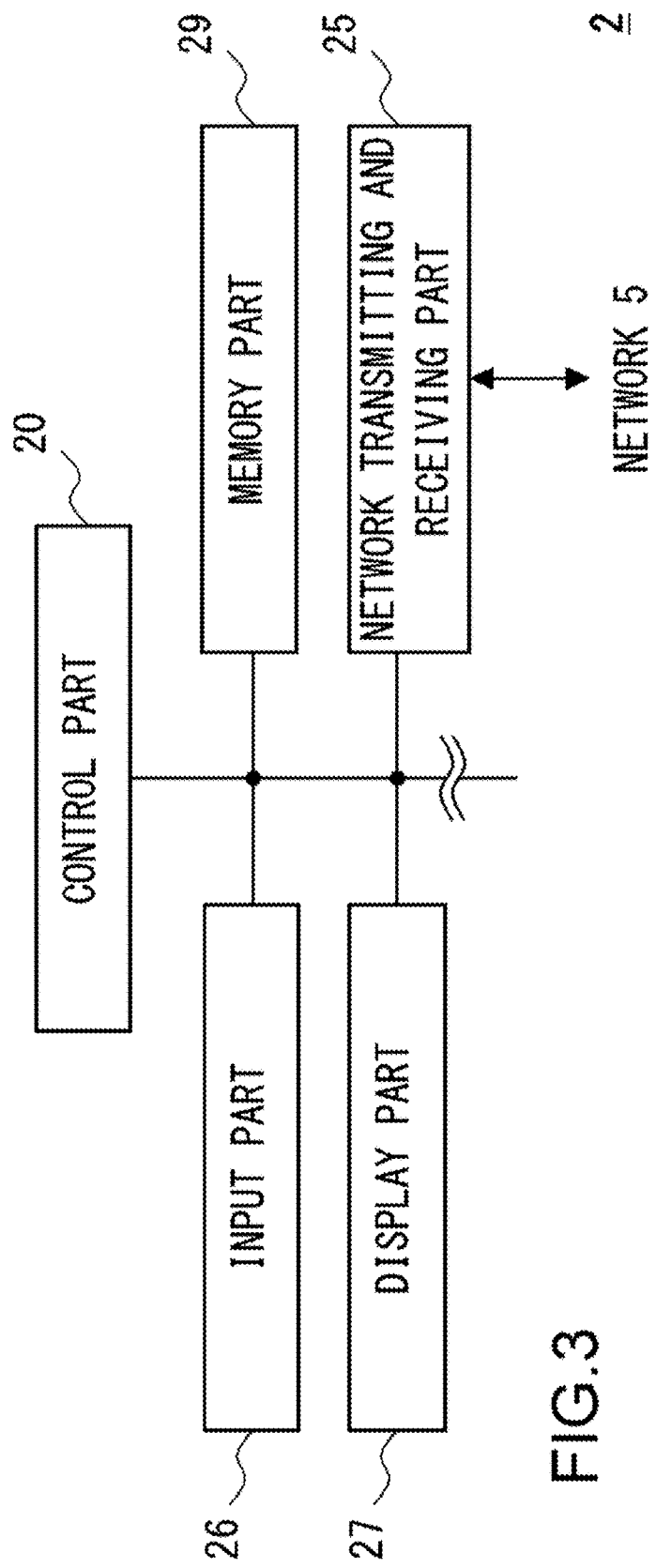
FIG. 3 is a block diagram showing a control configuration of the support terminal as shown in FIG. 1.

Firstly, as refer to FIG. 1-FIG. 3, the system configuration of image forming system X according to the embodiment of the present disclosure is explained.

According to FIG. 1, image forming system X according to the embodiment of the present disclosure includes image forming apparatus 1 and support terminal 2 for remote maintenance of image forming apparatus 1. Also, each apparatus is connected with network 5.

Image forming apparatus 1 is information processing apparatus, such as an MFP, a network scanner, a document scanner, network FAX, a printer, or the like. Also, image forming apparatus 1 can perform copying a document, printing, scanning, transmitting facsimile, or the like.

Also, in image forming apparatus 1 in the present embodiment, remote maintenance between remote places via network 5 is available. In service of the remote maintenance, an IT administrator, or the like, who is a customer, is in the side of image forming apparatus 1, and he or she perform maintenance by receiving instructions from a support personnel.

Support terminal 2 is PC, a mobile phone, a smart phone, PDA (Personal Data Assistant), a business-use support terminal, a dedicated terminal, or the like. Also, in support terminal 2, a kind of general-purpose OS (Operating System), or the like, is executed. Also, support terminal 2 can install a various application software (henceforth, an "application").

Also, support terminal 2 is a terminal for remote maintenance. The support personnel of the remote maintenance service as mentioned above use support terminal 2 and instructs to the IT administrator, or the like, for image forming apparatus 1. In this case, support terminal 2 displays a screen just emulated operation panel part 16 (FIG. 2) in image forming apparatus 1 and indicates various instructions on the screen. The contents of instructions by the support personnel via the screen are reflected on display part 47, or the like, in image forming apparatus 1. Also, image forming apparatus 1 is controlled corresponding to the button on the screen.

That is, in the present embodiment, the support may be performed with one to one communication by using function as a remote desktop function provided in an OS of a common PC. Therefore, for example, a RFB server, or the like is executed in image forming apparatus 1, and an RFB client is executed in support terminal 2. Also, support terminal 2 may execute the RFB client by using Java script (R), or the like. In this case, the image emulated operation panel part 16 can be displayed on support terminal 2, and image forming apparatus 1 can be controlled based on the displayed image. That is, support terminal 2 displays the emulated screen as a "remote panel" by using a web browser, and it can control image forming apparatus 1. In detail, it is possible to use functions, such as a print, a scan, FAX transmission and reception, and network FAX, in image forming apparatus 1 with instructions by the support personnel from support terminal 2. By using these functions, it becomes possible to check and to show solution of a problem situation for a customer's image forming apparatus 1 from a remote environment.

Network 5 is, in the present embodiment, LAN (Local Area Network), such as intranet, or the like, or WAN (Wide Area Network), such as the Internet, a mobile phone network, or the like. In case that network 5 is WAN, it connects with other servers via a router, a gateway, or the like. Also, network 5 may configure VPN (Virtual Private Network).

In addition, in image forming system X, it may include a plurality of image forming apparatuses 1 and support terminals 2, respectively.

(Configuration of Image Forming Apparatus 1)

Then, as refer to FIG. 2, a configuration of image forming apparatus 1 according to the embodiment of the present disclosure is explained. Image forming apparatus 1 may include image processing part 11, manuscript reading part 12, manuscript feeding part 13, feeding part 14, network transmitting and receiving part 15, operation panel part 16, image formation part 17 (image forming unit), FAX transmission and reception part 18, memory part 19, or the like. Each part is connected to control part 10, and these operations are controlled by control part 10.

Control part 10 is an information processing part, such as GPP (General Purpose Processor), CPU (Central Processing Unit), MPU (Micro Processing Unit), DSP (Digital Signal Processor), GPU (Graphics Processing Unit), ASIC (Application Specific Processor), or the like. Control part 10 reads the control program stored in ROM or HDD of memory part 19, expands to RAM, executes the control program, and is operated as each part of a functional block as described later. Also, control part 10 controls a whole device corresponding to specified instructions information inputted from support terminal 2 or operation panel part 16.

Image processing part 11 is a control arithmetic unit, such as DSP (Digital Signal Processor) or GPU (Graphics Processing Unit), or the like. Image processing part 11 performs specified image processing for image data. For example, the specified image processing may be a process of scaling, concentration tuning, tone adjustment, an image improvement, or the like. Also, image processing part 11 stores the image read by manuscript reading part 12 as print data in memory part 19. In this case, image processing part 11 can also convert print data into an electronic filing documents, such as PDF, or the like, or a file of an image data, such as TIFF, or the like. Also, image processing part 11 may be able to execute at least a part of a process of OCR (Optical Character Recognition).

Manuscript reading part 12 reads a set manuscript. Manuscript reading part 12 is arranged on the upper part of the body part of image forming apparatus 1. Manuscript reading part 12 is provided with a scanner, platen glass, and a manuscript reading slit. Manuscript reading part 12 moves the scanner to the position that faces the platen glass when reading the manuscript placed on the platen glass. Manuscript reading part 12 is read the manuscript placed on the platen glass with scanning and acquires image data. Manuscript reading part 12 outputs the acquired image data to control part 10.

Also, manuscript reading part 12 moves the scanner to the position which faces a manuscript reading slit when reading the manuscript fed from manuscript feeding part 13. Then, via the manuscript reading slit, manuscript reading part 12 reads the manuscript synchronizing with conveyance operation of the manuscript by manuscript feeding part 13, and it acquires image data. Manuscript reading part 12 outputs the acquired image data to control part 10.

Manuscript feeding part 13 conveys the manuscript read by manuscript reading part 12. Manuscript feeding part 13 is arranged on the upper part of manuscript reading part 12. Manuscript feeding part 13 is provided with a manuscript mounting part and a manuscript transport mechanism. Manuscript feeding part 13 feeds out the manuscript placed on the manuscript mounting part one sheet at a time by using the manuscript transport mechanism, and it feeds to manuscript reading part 12.

Feeding part 14 feeds out a recording paper one sheet at a time to image formation part 17. Feeding part 14 is provided in the body part.

Network transmitting and receiving part 15 is a network connection part including a LAN board, a wireless transceiver, or the like, for connecting with external networks, such as LAN, wireless LAN, WAN, the mobile phone network, or the like. Network transmitting and receiving part 15 transmits and receives data by using a line for data communications, and transmits and receives an audio signal by using a voice call line.

Operation panel part 16 is arranged in front-side of image forming apparatus 1. Also, operation panel part 16 includes input part 46 and display part 47.

Input part 46 is an input unit of a touch panel, physical buttons, or the like, which acquires the instructions by IT administrator, or the like, to image forming apparatus 1. Input part 46 may include buttons, such as a start, a stop, a reset, a copy, a transmission, and a FAX, or the like, to instruct for calling various functions. Also, input part 46 may include a physical numeric keypad, a "#Keys" button for displaying a numeric keypad on display part 47, a "home" button for returning to the "home" screen that is the first screen, or the like. Also, input part 46 may include various buttons, such as an "Interrupt" of a job, an "Authentication/Logout," an "Energy saver," or the like. Also, input part 46 may include buttons for making a various state of performing an instruction about the job change, such as an "Accessibility Display," a "Status/Job cancel," a "System Menu/Counter," or the like. Also, the job to be instructed may be types, such as printing, transmitting, storing, and recording for a selected document.

In addition, it is also possible to input and change each user's information with a user's instructions acquired from input part 46. Also, input part 46 can connect a reader for a magnetic card or an IC card, a device for biometric authentication, or the like.

Display part 47 includes a display panel, such as LCD (Liquid Crystal Display), an organic EL display, and an indicator, such as LED (Light Emitting Diode), or the like. The display panel of display part 47 can display a various operation screens of GUI (Graphical User Interface). In the present embodiment, input part 46 and display part 47 may be combined and configured as like a display having a touch panel. Therefore, it is also possible to arrange buttons for various operations on display part 47 and is instructed via input part 46 by depressing them. Also, as above-mentioned, it is possible to display a numeric keypad on display part 47. Also, LED of display part 47 can display various states. Also, LED can display the various states of the self-apparatus. Also, some of LED, or the like, for display part 47 may be provided inside of the button. Thereby, it can inspect a state of depression of the button, or the like.

Also, operation panel part 16 may be provided with a connecting part that connects with an external record medium, such as flash memory card, a USB storage apparatus, or the like.

Image formation part 17 makes the image formation from the data stored in memory part 19, read by manuscript reading part 12, or acquired from the external support terminal by a user's output instruction to a recording paper perform. Image formation part 17 is provided with a photo conductor drum, an exposure part, a developing part, a transfer part, a fixing part, or the like. Image formation part 17 records a toner image on a recording paper by performing an image formation process of electrification, exposure, development, transfer, and fixing.

FAX transmission and reception part 18 transmits and receives a facsimile. FAX transmission and reception part 18 can perform facsimile receiving from other FAX equipment via a voice line, can preserve it on memory part 19, and can perform image formation by image formation part 17. Also, FAX transmission and reception part 18 converts the manuscript read by manuscript reading part 12, the data of network FAX transmitted from the external support terminal into image data. FAX transmission and reception part 18 can perform facsimile transmission of the image data to other FAX equipment via a voice line.

Memory part 19 is a memory part having a non-transitory recording medium. Memory part 19 may include, for example, semiconductor memory, such as ROM (Read Only Memory), RAM (Random Access Memory), or the like, or HDD (Hard Disk Drive), or the like. RAM of memory part 19 may be held a memory content in a power-saving state by self refreshing function, or the like. The control program for operation-controlling image forming apparatus 1 is stored in ROM or HDD of memory part 19. The control program may be an OS and various applications. In addition, memory part 19 may also store user account settings. Also, an area of a storage folder (Document box) for each user may be included in memory part 19.

In addition, image forming apparatus 1, control part 10 and image processing part 11 may be integrally-formed as like CPU with built-in GPU, a chip-on module package, SOC (System On Chip), or the like. Also, control part 10 and image processing part 11 may contain RAM, ROM, a flash memory, or the like.

(Configuration of Support Terminal 2)

Also, according to FIG. 3, support terminal 2 is provided with control part 20, network transmitting and receiving part 25, input part 26, display part 27, memory part 29, or the like.

Control part 20 may be an information processing part, such as GPP (General Purpose Processor), CPU (Central Processing Unit), MPU (Micro Processing Unit), DSP (Digital Signal Processor), GPU (Graphics Processing Unit), ASIC (Application Specific Processor, processor for particular applications), or the like.

Input part 26 is a keyboard, various sensors, a pointing device, or the like, for acquiring the various instructions by a user. The pointing device includes a touch panel, a digitizer, a touchpad, or the like. Input part 26 can make various instructions input by a user, such as the support personnel, or the like, by using GUI (Graphical User Interface) of OS and can acquire this. Also, information of moving the pointer and depressing a key (physical key) of the keyboard in input part 26 is transmitted to image forming apparatus 1. That is, the display of display part 27 explained below is updated based on this information.

Display part 27 includes a flat-panel screen panel, such as LCD, an organic EL display, a FED (Field Emission Display), a fluorescent character display tube, or the like, a projector, LED for a status display, or the like. Display part 27 can display various operation screens according with GUI. In addition, input part 26 and display part 27 may be integrally-formed as like a display with the touch panel or the digitizer.

Network transmitting and receiving part 25 is a network connection part including a LAN board, a wireless transceiver, or the like, for connecting with network 5.

Memory part 29 is a memory part having a non-transitory recording medium. Memory part 29, for example, may include various RAM as a main memory part. Also, memory part 29, for example, may include ROM, eMMC (embedded Multi Media Card), SSD (Solid State Drive), HDD, or the like as an auxiliary memory part. Also, memory part 29 stores a control program for the self-apparatus. The control program may be various OS, a web browser that can browse webs, such as WWW, or the like, various applications, or the like. Also, memory part 29 may include external storages, such as various flash memories, optical recording media, or the like.

[Functional Configuration of Image Forming System X]

Figure 4:
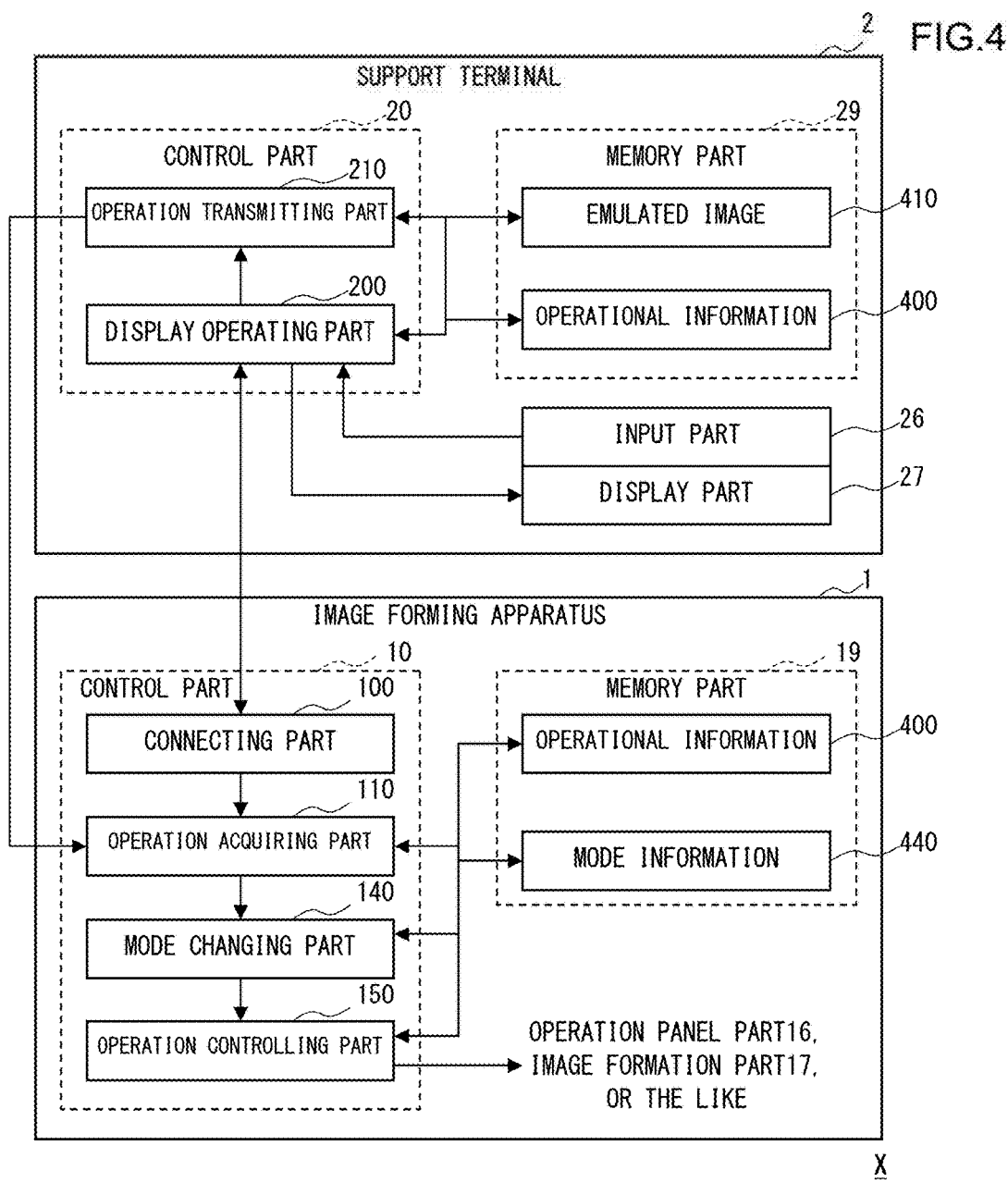
FIG. 4 is a block diagram showing a functional configuration of the image forming system according to the embodiment of the present disclosure.

Here, as refer to FIG. 4, a functional configuration of image forming system X in the present embodiment is explained. Control part 10 in image forming apparatus 1 includes connecting part 100, operation acquiring part 110, mode changing part 140, and operation controlling part 150. Memory part 19 in image forming apparatus 1 stores operational information 400 and mode information 440. Control part 20 in support terminal 2 includes display operating part 200 and operation transmitting part 210. Memory part 29 in support terminal 2 stores operational information 400 and emulated image 410.

Connecting part 100 connects with support terminal 2 in a session of a specific protocol. The specific protocol may be a protocol extended from the RFB protocol. In this case, connecting part 100 may execute a program compatible with the RFB server. Also, connecting part 100 can transmit emulated image 410 to support terminal 2 according to the instructions from operation acquiring part 110. The transmission may be executed as corresponded to the RFB protocol.

Operation acquiring part 110 acquires operational information 400 corresponding to operation of support terminal 2 connected by connecting part 100. Also, operation acquiring part 110 interprets operational information 400, updates display part 47 of operation panel part 16, and generates and updates emulated image 410 corresponding to this. In this case, operation acquiring part 110 may generate and update emulated image 410 based on states of a display panel, LED, or the like, in display part 47.

Mode changing part 140 changes a state of image forming apparatus 1 to a normal control mode or a guidance mode by operational information 400 acquired by operation acquiring part 110. The normal control mode is a mode that controls each part, actually. The guidance mode is a mode that controls each part for guidance. Mode changing part 140 sets the change of the mode to mode information 440. In detail, mode changing part 140 analyzes operational information 400 and changes the mode when an area of an image for a mode change button is depressed with a pointer. Mode changing part 140 may determine the area of the image for the mode change button by a coordinate of the pointer. That is, the guidance mode and the normal control mode can be changed with instructions by the support personnel.

Operation controlling part 150 refers mode information 440, which is changed and set up by mode changing part 140, and controls each part by operational information 400. In detail, operation controlling part 150 performs a guidance display in the guidance mode. In the guidance mode, operation controlling part 150 changes operation panel part 16 and/or a display of a state change in image forming apparatus 1. That is, operation controlling part 150 controls displaying of the display panel, LED, or the like, of display part 47 in operation panel part 16 as the remote panel in support terminal 2. This is the same as the normal control mode. However, in the guidance mode, operation controlling part 150 does not perform control of other parts. That is, in the present embodiment, operation controlling part 150 does not operate, for example, image processing part 11, manuscript reading part 12, manuscript feeding part 13, feeding part 14, image formation part 17, and FAX transmission and reception part 18, or the like. Also, in this case, operation controlling part 150 may not change settings, various files, or the like, which are stored in memory part 19. That means, in the guidance mode, even if the support personnel instruct by depressing a button to control the functions, or the like, in the remote panel executed in support terminal 2, the instructions are not performed in image forming apparatus 1. On the other hand, in the normal control mode, operation controlling part 150 performs normal control corresponding to the instruction by depressing a button, or the like. That is, operation controlling part 150 performs the display of display part 47 in operation panel part 16 as the guidance mode. Further, operation controlling part 150 also performs control of other parts.

Display operating part 200 connects with connecting part 100 in image forming apparatus 1. In the present embodiment, display operating part 200 may connect with connecting part 100 with the protocol extended from the RFB protocol. In this case, display operating part 200 may execute the "remote panel," which is a program compatible with the RFB client for image forming apparatus 1. Also, display operating part 200 acquires emulated image 410 from above-mentioned connecting part 100 in image forming apparatus 1 and displays it on display part 27. Also, display operating part 200 may execute the remote panel on the web browser in support terminal 2 by using Java script (R), or the like. The program compatible with the RFB client is acquired by connecting with the web server in image forming apparatus 1 or, otherwise, it may be acquired by accessing a web site of a server for a support. Thereby, without prior-installation the dedicated application, and it becomes possible to use the remote panel.

Also, in the present embodiment, display operating part 200 can move the pointer in all areas of emulated image 410 displayed on the web browser in support terminal 2. The areas may include areas other than the area for image of the display panel, which is actually-displayed on display part 47 in operation panel part 16 in image forming apparatus 1. In the present embodiment, as described later, an image of the mode change button is included in an area other than the display panel.

Operation transmitting part 210 acquires various instructions of the support personnel on the remote panel and transmits them to image forming apparatus 1. In detail, in the present embodiment, operation transmitting part 210 acquires pointer data about movement and depression of the pointer in emulated image 410 rendered on display part 27. Further, operation transmitting part 210 transmits the pointer data as operational information 400 to image forming apparatus 1 in the session. Also, operation transmitting part 210 can acquire the pointer data having for an area of the physical buttons of operation panel part 16 on emulated image 410.

Also, operation transmitting part 210 can also acquire pointer data on the area for the image of the mode change button in emulated image 410 as operational information 400.

Also, in the present embodiment, display part 27 displays emulated image 410.

Operational information 400 is information for an operation by the support personnel in the remote panel. In detail, operational information 400 may include the pointer data about movement and depression of the pointer in emulated image 410, or the like. Also, operational information 400 may include the information of depression of a button as the pointer data. As information of depression of the button, the information of depression for a physical key in input part 26 may be included. The information of depression for the physical key may be acquired as like the information of depression of the button drawn on emulated image 410 as corresponded to a short-cut key, or the like.

Also, as above-mentioned, operational information 400 may include the pointer data on the area for the image for the mode change button, which changes the mode, or the like.

Emulated image 410 is an image data of emulated operation panel part 16 for image forming apparatus 1 displayed on the web browser. Emulated image 410 may also include an image that emulates an appearance of input part 46 and display part 47 of operation panel part 16. Also, emulated image 410 is a dot matrix image corresponding to the RFB protocol and may be partially- or entirely-updateable on image forming apparatus 1 and support terminal 2. The detailed example of emulated image 410 is described later.

Mode information 440 is information, which may include a flag, or the like, showing a state in the present mode. That is, mode information 440 may be set up the value "1" in the guidance mode, "0" in the normal control mode, or the like.

(Screen Example of Emulated Image 410)

Figure 5:
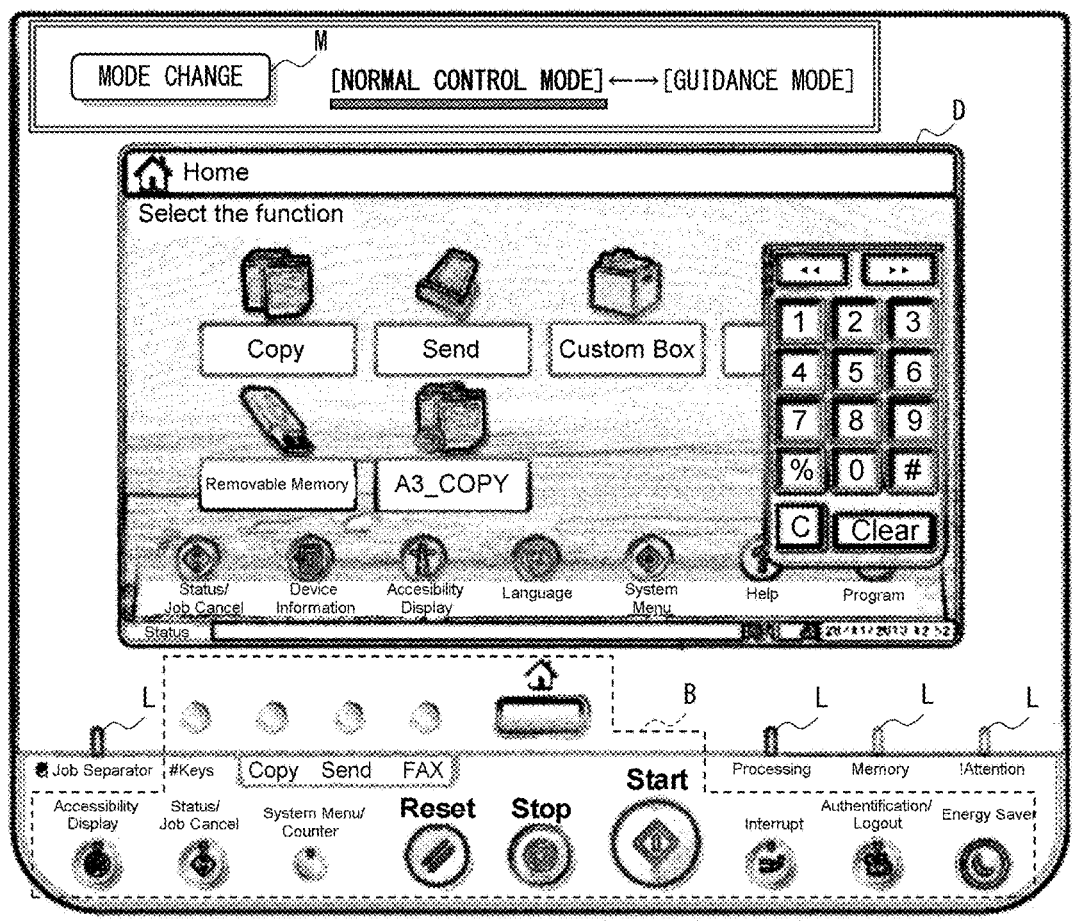
FIG. 5 shows a screen example of the emulated image shown in FIG. 4.

Here, as refer to FIG. 5, a screen example of emulated image 410 is explained. Emulated image 410 in the present embodiment includes, for example, panel D, which is an image of an area emulated the display panel of display part 47. Also, emulated image 410 includes button group B that shows the various buttons corresponding to input part 46 of image forming apparatus 1. That is, button group B is an image of the area emulated physical buttons, which is in the area other than the display panel of display part 47 of operation panel part 16 in image forming apparatus 1. Also, emulated image 410 includes image of indicator L, which is emulated LED, or the like. The image of these areas may be updated by operation of the support personnel. The support personnel control image forming apparatus 1 by depressing each button of panel D and button group B on emulated image 410. The control result is reflected in panel D and indicator L by using emulated image 410 acquired from image forming apparatus 1.

Also, emulated image 410 includes the image for mode change button M to change the mode outside of the area displayed in operation panel part 16. The area of the mode change button M may be on a place different from the areas of panel D, indicator L, and button group B. Also, the mode change button M may be included only in emulated image 410, and it may not be present in real operation panel part 16 in image forming apparatus 1.

In addition, mode change button M may be arranged other than the inside of emulated image 410, or may be set up with a menu, a button, or the like in a web browser. Also, a configuration that includes the equivalent instructions as depression of mode change button M in operational information 400 by depressing a key of input part 26, or the like, is also possible.

Here, control part 10 of image forming apparatus 1 executes the control program stored in memory part 19 and is functioned as connecting part 100, operation acquiring part 110, mode changing part 140, and operation controlling part 150. Also, control part 20 of support terminal 2 executes the control program stored in memory part 29 and is functioned as display operating part 200 and operation transmitting part 210.

Also, each part of the above-mentioned image forming apparatus 1 and support terminal 2 serves as hardware resources to execute the communication processing method in the present disclosure. In addition, the above-mentioned part or arbitrary combination of a functional configuration may be configured as in hardware with an IC, a programmable logic, FPGA (Field Programmable Gate Array), or the like.

[Guidance Mode Switching Process in Image Forming System X]

Figure 6:
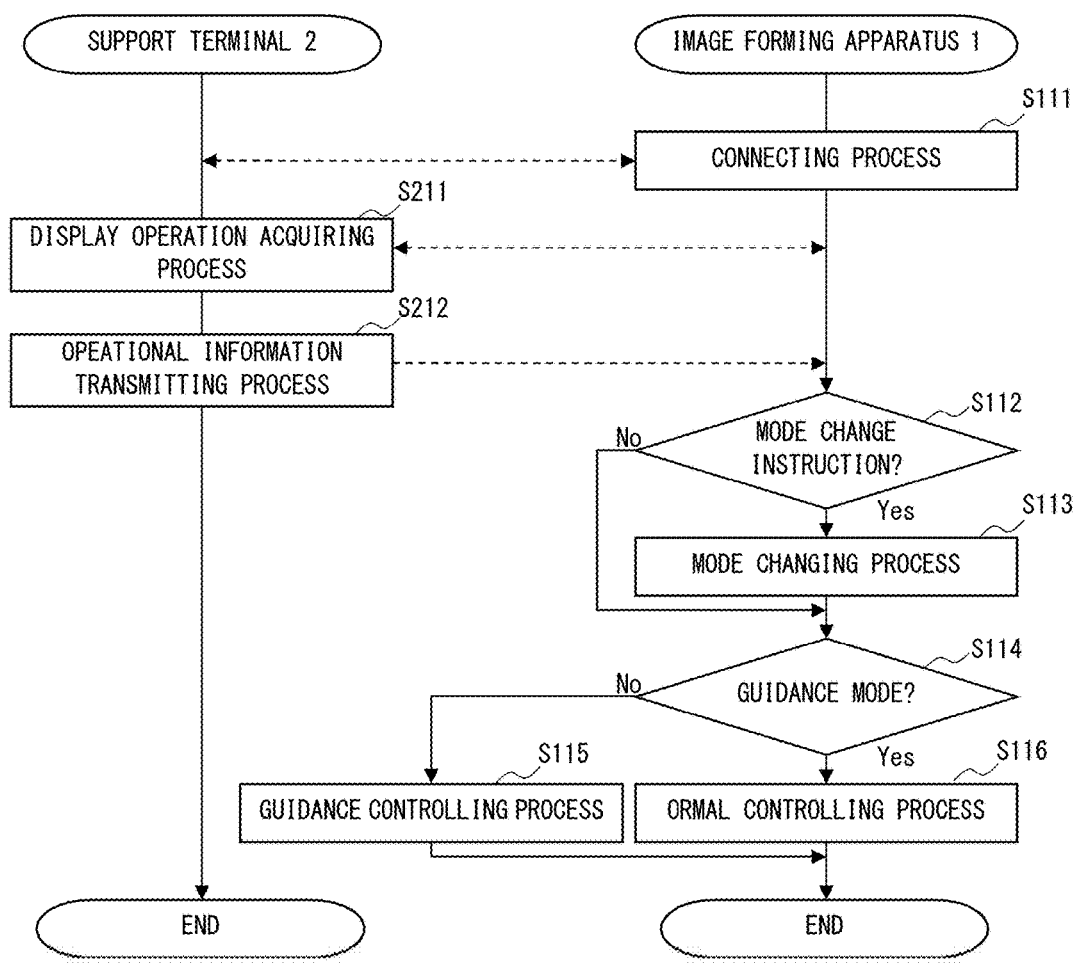
FIG. 6 is a flow chart of a guidance mode switching process according to the embodiment of the present disclosure.

Then, as refer to FIG. 6, a guidance mode switching process in image forming system X according to the embodiment of the present disclosure is explained. In the guidance mode switching process of the present embodiment, mainly, control part 10 of image forming apparatus 1 executes the control program stored in memory part 19, control part 20 of support terminal 2 executes the control program stored in memory part 29 with collaborating each part and using hardware resources. In the following, as refer to a flow chart in FIG. 6, the details of the guidance mode switching process are explained for each step.

(Step S111)

Firstly, connecting part 100 of image forming apparatus 1 performs a connecting process. The IT administrator, or the like, uses service of remote maintenance in time of problem solving or training of image forming apparatus 1, or the like. In this case, IT administrator, or the like, may also possibly receive and answer by voice message, directly, with the support personnel in the support terminal 2 by using a voice line, or the like, connected with the image forming apparatus 1. The support personnel may communicate that starting remote maintenance by using the remote panel function of image forming apparatus 1 is desired. Then, IT administrator, or the like, instructs to execute the remote panel as remote maintenance by using operation panel part 16 in image forming apparatus 1, or the like. Thereby, connecting part 100 connects with support terminal 2 in a session of the specific protocol, such as a protocol extended from the RFB protocol. In this case, connecting part 100 executes a program compatible with the RFB server.

Also, in this case, display operating part 200 in support terminal 2 acquires, for example, communication error of the session, an environment information of support terminal 2, an environment information of the self-apparatus, or the like, as log information 420, and stores it in memory part 29, temporarily.

(Step S211)

Here, display operating part 200 in support terminal 2 performs a display operation acquiring process. The support personnel of support terminal 2 starts the web browser and executes the "remote panel" that is a program compatible with the RFB client. Thereby, display operating part 200 connects with connecting part 100 in image forming apparatus 1 with the protocol extended from the RFB protocol. Thereby, emulated image 410 is displayed on the web browser, and movement, depression of the pointer, or the like, is enabled by input part 26.

(Step S212)

Then, operation transmitting part 210 performs an operational information transmitting process. Operation transmitting part 210 acquires rectangle coordinates of the pointer moved in emulated image 410 on the web browser as the pointer data. Also, operation transmitting part 210 acquires information of depression of a button or a physical key and adds it to the pointer data, too. Operation transmitting part 210 transmits the pointer data as operational information 400 to image forming apparatus 1.

Here, operation transmitting part 210 may also acquire pointer data on the area of the image for the mode change button in emulated image 410 as operational information 400 and may transmit them.

(Step S112)

Then, mode changing part 140 determines an instruction of mode change exists or not. If the area of the image for the mode change button is depressed by the pointer in operational information 400, mode changing part 140 determines Yes. In other cases, mode changing part 140 determines No. In Yes, mode changing part 140 advances a process to Step S113. In No, mode changing part 140 advances a process to Step S114.

(Step S113)

If there is the instruction of the mode change, mode changing part 140 performs a mode changing process. Mode changing part 140 changes the state in the present mode with reference to mode information 440. That is, mode changing part 140 will change to guidance mode if the present mode is the normal control mode. Also, mode changing part 140 will change to a normal control mode if the present mode is guidance mode. Mode changing part 140 may perform this change by reversing the flag of mode information 440, or the like. Also, in the example of emulated image 410 as shown in FIG. 5, mode changing part 140 may switch a highlight, a cursor, or the like, in "normal control mode" or "guidance mode" for the column where mode change button M is arranged. Thereby, it may show to the support personnel that the state in the present mode is changed. In addition, in this case, the display of button M itself may be changed to the "normal control mode" or the "guidance mode" in the remote panel.

(Step S114)

Then, operation controlling part 150 determines whether it is in the guidance mode or not. Operation controlling part 150 determines Yes if mode information 440 is in the guidance mode. Operation controlling part 150 determines No if mode information 440 is in the normal control mode. In Yes, operation controlling part 150 advances a process to Step S115. In No, operation controlling part 150 advances a process to Step S116.

(Step S115)

If it is in the guidance mode, operation controlling part 150 performs a guidance controlling process. Here, operation controlling part 150 controls each part by operational information 400 corresponding to the guidance mode. Operation controlling part 150 performs a guidance display. That is, although operation controlling part 150 changes displaying of display part 47 of operation panel part 16, it does not control other parts. For example, in the guidance mode, operation controlling part 150 does not operate image formation part 17, or the like. Also, for example, even if updating for setting information, address book information, or the like, is instructed, these data in memory part 19 are not changed.

(Step S116)

If it is in the normal control mode, operation controlling part 150 performs a normal controlling process. Here, operation controlling part 150 controls as corresponded to the normal control mode. That is, operation controlling part 150 may change displaying for display part 47 of operation panel part 16 and may control other parts. In this case, operation controlling part 150 operates, for example, image formation part 17, or the like. Also, if updating setting information, address book information, or the like, is instructed, these data in memory part 19 are actually-changed. As the above-mentioned, the guidance mode switching process according to the embodiment of the present disclosure is ended.

As configured as mentioned above, the following effects can be obtained. In typical technology, only a guide image is displayed to a transparent panel piled up on the display panel of the image forming apparatus. That is, the image forming apparatus is not to be actually-operated. Otherwise, a remote panel used for remote maintenance is configured as a screen display and its control are combined in one. Therefore, when the support person performs panel operation on the remote panel, controls of each part are actually-performed in the image forming apparatus. Therefore, also when the support person educates how to operate the image forming apparatus, or the like, to IT administrator, or the like, each part is unexpectedly-controlled, and a case of inconvenience is happened. For example, there are cases, such as education for changing the setting information stored in the memory part, editing work of an address book, performing an operation of a complicated copy, or the like. On the other hand, image forming system X according to the embodiment in the present disclosure includes image forming apparatus 1 and support terminal 2 for the remote maintenance of image forming apparatus 1. Image forming apparatus 1 is provided with connecting part 100, operation acquiring part 110, mode changing part 140, and operation controlling part 150. Connecting part 100 connects with support terminal 2 for remote maintenance in a session of a specific protocol. Operation acquiring part 110 acquires operational information 400 corresponding to operation of support terminal 2 connected by connecting part 100. Mode changing part 140 is changed to a normal control mode that actually-controls each part, and a guidance mode that controls each part for guidance by operational information 400 acquired by operation acquiring part 110. Operation controlling part 150 controls each part by operational information 400 corresponding to the mode changed by mode changing part 140. Support terminal 2 is provided with display part 27 and operation transmitting part 210. Display part 27 displays emulated image 410 that is emulated on the operation panel of image forming apparatus 1. Operation transmitting part 210 transmits operational information 400 including pointer data about movement and depression of a pointer on emulated image 410 to image forming apparatus 1 in the session. As configured in this way, when operational information 400 in a remote panel is transmitted to image forming apparatus 1 in the guidance mode, only display part 47 is updated. That is, in the guidance mode, the image formation part 17, or the like, in image forming apparatus 1 does not work. As a result, wasting of a recording paper by a complicated copy, or the like, is prevented. Also, even if it updates setting information and address book information, each memory content of memory part 19 is not changed. Therefore, trouble by change of data is not happened, and operations to restore data, or the like, become unnecessary. Also, by changing into the normal control mode from the guidance mode, it can return to the state before changing the mode to guidance mode. Thereby, not only make operation accessible by the support personnel, but also an image forming apparatus controllable for the image forming apparatus itself can be provided.

Also, in image forming apparatus 1 according to the embodiment of the present disclosure, in the guidance mode, operation controlling part 150 changes operation panel part 16 that operates a self-apparatus, and/or a display of a state change of the self-apparatus. Further, operation controlling part 150 performs a guidance display that does not perform control of other parts. As configured in this way, also in the guidance mode, it becomes possible to indicate, light, or the like, the display panel, the LED, or the like, in display part 47 of image forming apparatus 1 according to the operation of the support personnel. Thereby, an operation method can be shown for IT administrator, or the like, intelligibly, and educational effects, or the like, can be raised.

Also, image forming apparatus 1 according to the embodiment of the present disclosure, the specific protocol is a protocol that extends from the RFB protocol, operational information 400 includes pointer data about movement and depression of a pointer on emulated image 410 that is emulated on the operation panel part of the self-apparatus and is displayed on support terminal 2. As configured in this way, it extends with maintaining the specification of the RFB protocol. Thereby, it enables to perform the instructions that change the present mode by operation of the pointer for emulated image 410.

Also, in image forming apparatus 1 according to the embodiment of the present disclosure, emulated image 410 includes an image for a mode change button that changes the mode in an area other than an area of emulated display of operation panel part 16 in the self-apparatus. Also, mode changing part 140 changes the present mode when the area of the image for the mode change button is depressed with a pointer in operational information 400. As configured in this way, it is enabled to change the present mode by using the mode change button, which is displayed only on support terminal 2 and does not exist on image forming apparatus 1 itself. That is, only the support personnel can change the present mode, easily. Also, because only the support personnel can operate the mode change button, malfunction is prevented. Also, the support personnel can be shown intelligibly whether it is in the guidance mode, or it is the normal control mode.

[Other Embodiments]

In the above-mentioned embodiment, an example that executes the remote panel with the RFB protocol is explained. However, a remote panel may be performed with other original protocols, and the above-mentioned remote maintenance may be performed. Also, in an above-mentioned embodiment, an example that a program corresponding to an RFB client is executed on a web browser in support terminal 2 to perform the remote panel is explained. However, in support terminal 2, a dedicated application may be installed, and a remote panel may be performed. For example, emulated image 410 may be generated in image forming apparatus 1, without using VNC, or the like, the image may be pushed to the web browser or the dedicated application, serially, or streaming may be performed in support terminal 2. Also, contrary, in support terminal 2, an operation display program that generates emulated image 410 of image forming apparatus 1 corresponding to operation of the support personnel may be executed. In this case, by executing the operation display program, operational information 400 may be transmitted as well as the above-mentioned configuration, and image forming apparatus 1 may be controlled. Also, in this case, without transmitting the image data itself from image forming apparatus 1, only data required to generate emulated image 410, which is data related to a user file, or the like, may be transmitted. In addition, the operation display program may be a "real" emulator that executes the control program, which is similar program stored in memory part 19 in image forming apparatus 1, at support terminal 2. As configured in this way, a remote panel can be established even if an environment that the RFB protocol is unusable, for example, environment connectable only with the port of HTTP, or the like. Also, it is also possible to configure so as to compress the bandwidth of data related to transmission and reception of data.

In the above embodiment, an example that the mode change button is arranged within emulated image 410 is explained. However, the mode change button may be arranged other than the inside of emulated image 410, or may be set up with a menu, a button, or the like, on the web browser. Also, a configuration that includes the instruction similar to depression of mode change button M in operational information 400 by depression of the key of input part 26, or the like, is also possible.

Also, in the above-mentioned embodiment, it is mainly-disclosed an example that operation by the support personnel is reflected in displaying or controlling to image forming apparatus 1. However, the operation by IT administrator, or the like, to operation panel part 16 in image forming apparatus 1 may be reflected in controlling of emulated image 410 or image forming apparatus 1. Also, it is possible to configure that the reflected result may be transmitted to support terminal 2. Thereby, in addition to instruction and operation by the support personnel, corresponding to actual operation by IT administrator, emulated image 410 can be generated, or image forming apparatus 1 can be controlled. This can help IT administrator in training, or the like, understand well.

Also, in above-mentioned embodiment, it mainly explained an example that preserves log information 420 in image forming apparatus 1 as independent data. However, image forming apparatus 1 may store log information 420 so that it can be extracted as a part of another history or log for the self-apparatus. This makes it easier to investigate the problem by comparing with other states, or the like, in the image forming apparatus. Also, it becomes possible to acquire a history and a log in bundle by a server for management of remote maintenance, or the like. Thereby, it becomes easier for the support personnel, the service person, the developer of remote maintenance service, or the like, to utilize log information 420.

Also, the present disclosure is applicable to information processing apparatus other than the image forming apparatus. That is, it may be configured to use the network scanner, a server, or the like, which separately-connected with a scanner by USB, or the like.

Also, the configuration and operation of the above-mentioned embodiment are an example, and it cannot be over-emphasized that it can change suitably and can execute in the range that does not deviate from the aim of the present disclosure.

What is claimed is:

1. An image forming system having an image forming apparatus and a terminal for remote maintenance of the image forming apparatus, wherein;

the image forming apparatus includes a connecting part configured to connect with the terminal in a session of a specific protocol;

an operation acquiring part configured to acquire operational information corresponding to operation of the terminal connected by the connecting part;

a mode changing part configured to independently change to a first state of a self-apparatus and a second state of the self-apparatus by the operational information acquired by the operation acquiring part, wherein each of the first state and the second state are different modes configured to be executable during remote maintenance of the image forming apparatus, and wherein the first state is a normal control mode actually-controlling each part, and wherein the second state is a guidance mode controlling a display for the purpose of guidance for control of each part without actually-controlling each part other than the display; and an operation control part configured to control each part by the operational information corresponding to the mode changed by the mode changing part;

the terminal includes a display part configured to display an emulated image emulated on an operation panel part of the image forming apparatus; and an operation transmitting part configured to transmit the operational information having pointer data about movement and depression of a pointer on the emulated image to the image forming apparatus in the session;

the emulated image has an image for a mode change button changing the mode in an area other than an area displayed in the operation panel part of the self-apparatus; and the mode changing part changes the mode when the area of the image for the mode change button is depressed with the pointer in the operational information.

2. The image forming system according to claim 1, wherein the operation controlling part performs, in the guidance mode, guidance display that changes display of the operation panel part and/or state change of the self-apparatus but does not perform control of other part.

3. The image forming system according to claim 1, wherein the specific protocol is a protocol that extends from an RFB protocol.

4. A communication processing method executed by an image forming apparatus capable of communicating with a terminal for remote maintenance, comprising the steps of:

acquiring an operational information corresponding to operation of the terminal;

selecting a mode from a plurality of modes executable during remote maintenance to change a state of a self-apparatus by the operational information acquired by the operation acquiring part, wherein the modes that can be selected include a normal control mode actually-controlling each part, and a guidance mode controlling a display for the purpose of guidance for control of each part without actually-controlling each part other than the display, and controlling each part by the operational information corresponding to changed mode, performing, in the guidance mode, guidance display that changes display of an operation panel part and/or state change of the self-apparatus but does not perform control of other part;

wherein the specific protocol is a protocol that extends an RFB protocol;

the operational information has pointer data about movement and depression of a pointer on an emulated image emulated on the operation panel part of the self-apparatus and displayed on the terminal;

the emulated image has an image for a mode change button changing the mode in an area other than an area displayed in the operation panel part of the self-apparatus; and the method comprises changing the mode when the area of the image for the mode change button is depressed with the pointer in the operational information.

5. An image forming apparatus comprising:

a connecting part configured to connect with a terminal for remote maintenance in a session of a specific protocol;

an operation acquiring part configured to acquire operational information corresponding to operation of the terminal connected by the connecting part;

a mode changing part configured to independently change to a first state of a self-apparatus and a second state of the self-apparatus by the operational information acquired by the operation acquiring part, wherein the first state and the second state are different modes, each configured to be executable during remote maintenance of the image forming apparatus;

the first state is a normal control mode actually-controlling each part, and the second state is a guidance mode controlling a display for the purpose of guidance for control of each part without actually-controlling each part other than the display;

the image forming apparatus further comprises an operation controlling part configured to control each part by the operational information corresponding to the mode changed by the mode changing part;

the operation controlling part performs, in the guidance mode, guidance display that changes display of an operation panel part operating the self-apparatus and/or state change of the self-apparatus but does not perform control of other part; and the guidance mode does not perform control of parts other than the display, wherein the guidance mode displays a button that is displayed the same as a corresponding button of the normal mode for controlling a respective part, and wherein depressing of said button displayed in the guidance mode does not actually control said respective part.

* * * * *